United States Patent [19]

Zaweski et al.

[11] 4,278,555

[45] Jul. 14, 1981

[54] LUBRICANT COMPOSITION

[75] Inventors: Edward F. Zaweski, Pleasant Ridge, Mich.; Christian S. Harstick, Crestwood, Mo.

[73] Assignee: Ethyl Corporation, Richmond, Va.

[21] Appl. No.: 105,725

[22] Filed: Dec. 20, 1979

Related U.S. Application Data

[63] Continuation-in-part of Ser. No. 960,763, Nov. 15, 1978, abandoned.

[51] Int. Cl.³ .............................................. C10M 1/20
[52] U.S. Cl. ............................... 252/52 A; 252/52 R; 252/393
[58] Field of Search .................... 252/52 R, 52 A, 393

[56] References Cited

U.S. PATENT DOCUMENTS

| | | | |
|---|---|---|---|
| 2,681,315 | 6/1954 | Tongberg et al. | 252/52 R |
| 2,833,717 | 5/1958 | Whitacre | 252/33.4 |
| 3,101,374 | 8/1963 | Patton | 544/357 |
| 3,509,052 | 4/1970 | Murphy | 252/34.7 |
| 3,917,537 | 11/1975 | Elsdon | 252/52 A |
| 3,928,219 | 12/1975 | Papay et al. | 252/51.5 R |

*Primary Examiner*—W. J. Shine
*Attorney, Agent, or Firm*—Donald L. Johnson; John F. Sieberth; Joseph D. Odenweller

[57] ABSTRACT

Lubricating oil formulated for use in an engine crankcase having improved anticorrosion property imparted by addition of a minor amount of the combination of (A) a block-oxyalkylated trimethylol alkane containing an initial hydrophobic block of propyleneoxy and optionally random ethyleneoxy units and a terminal hydrophilic block of ethyleneoxy and optionally random propyleneoxy units and (B) an oxyethylated alkylphenol.

12 Claims, No Drawings

LUBRICANT COMPOSITION

CROSS REFERENCE TO RELATED APPLICATION

This application is a continuation-in-part of application Ser. No. 960,763, filed Nov. 15, 1978, now abandoned.

BACKGROUND

Oil formulated for use in an engine crankcase contains various additives which serve different functions. Ashless dispersants are added to prevent deposition of engine sludge. Zinc dihydrocarbyldithiophosphate is added to inhibit wear and provide antioxidant protection. Alkaline earth metal alkylbenzene or petroleum sulfonates function as high temperature detergents. Overbased alkaline earth metal sulfonates or salicylates provide both detergent action and an alkaline reserve to protect engine parts against corrosion. Use of certain surfactants for lubricating oil is discussed in U.S. Pat. Nos. 3,509,052 and 3,928,219. These include certain oxyalkylated polyols, oxyalkylated ethylenediamine, nonylphenyl polyethylene glycol ethers and the like.

SUMMARY

It has now been found that an improved crankcase lubricating oil can be formulated by including a small amount of an oxyalkylated trimethylol alkane in combination with an oxyethylated alkylphenol. Tests have been carried out which demonstrate that the combination provides rust protection beyond that provided by either individual component.

DESCRIPTION OF THE PREFERRED EMBODIMENT

A preferred embodiment of the invention is a lubricating oil composition comprising a major amount of lubricating oil and a minor corrosion inhibiting amount of the combination of (a) an oxyalkylated trimethylol alkane having a molecular weight of about 1,000–8,000 in which an initial hydrophobic oxyalkylene block is bonded to trimethylol alkane and a terminal hydrophilic oxyalkylene block is bonded to the other end of said hydrophobic block, said hydrophobic block consisting essentially of propyleneoxy units and optionally containing random ethyleneoxy units in an amount such that the average oxygen-to-carbon atom ratio in said hydrophobic block does not exceed 0.4, said hydrophilic block consisting essentially of ethyleneoxy units and optionally propyleneoxy units such that the oxygen-to-carbon atom ratio in said hydrophilic block is in excess of 0.4, said hydrophilic block forming 5–90 weight percent of said oxyalkylated trimethylol alkane, (b) an ethoxylated $C_{4-12}$ alkylphenol containing an average of about 2–10 ethyleneoxy units and (c) an overbased metal detergent selected from the group consisting of alkaline earth metal alkylbenzene sulfonates, petroleum sulfonates, phenates, sulfurized phenates and salicylates.

The block oxyalkylated trimethylol alkane is made by first reacting trimethylol alkane with propylene oxide or a mixture of propylene oxide and ethylene oxide having an oxygen-to-carbon atom ratio not in excess of 0.4. Propylene oxide has an oxygen-to-carbon atom ratio of 0.33 and ethylene oxide has an oxygen-to-carbon atom ratio of 0.5. Hence an atom ratio of 0.33–0.4 would include propylene oxide containing from 0 to about 41 mole percent ethylene oxide.

More preferably, the hydrophobic block contains about 5–40 mole percent ethyleneoxy units and 60–95 mole percent propyleneoxy units. The units are randomly distributed.

In one preferred embodiment the initial condensation of the hydrophobic block is conducted until the average combined molecular weight of trimethylol alkane and the hydrophobic block is about 1,000–4,000.

Following this the intermediate oxyalkylated trimethylol alkane is reacted with ethylene oxide or a mixture of ethylene oxide and propylene oxide in which the mixture has an average oxygen-to-carbon atom ratio in excess of 0.4. This reaction bonds a terminal hydrophilic oxyalkylene block to the reactive hydroxy end of the initial hydrophobic block.

Mixtures used to form the hydrophilic block contain in excess of 41 mole percent ethylene oxide. Preferably, the mixture contains at least 4 mole percent propylene oxide.

More preferably, the mixture used to form the hydrophilic block contains about 4–40 mole percent propylene oxide and 60–96 mole percent ethylene oxide. The second condensation is carried out using sufficient ethylene oxide or ethylene oxide-propylene oxide mixture to form a hydrophilic block having about 1,000–5,000 average mole weight.

Representative trimethylol alkanes include trimethylol ethane, propane or butane. In a most preferred embodiment the trimethylol alkane is trimethylol propane.

The oxyalkylated trimethylol alkane has the formula

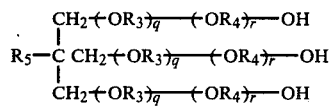

wherein $-(OR_3)_{\overline{q}}-$ represents a hydrophobic block in which $R_3$ is a divalent aliphatic group containing 2 or 3 carbon atoms derived from propylene oxide and optionally ethylene oxide, $-(OR_4)_{\overline{r}}-$ represents a hydrophilic block in which $R_4$ is a divalent aliphatic group containing 2 or 3 carbon atoms derived from ethylene oxide and optionally propylene oxide, $R_5$ is an alkyl group containing 1–4 carbon atoms and q and r are integers.

The hydrophobic block consists essentially of propyleneoxy units but can contain up to 41 mole percent random ethyleneoxy units such that the average oxygen-to-carbon atom ratio does not exceed 0.4. For example, when $-(OR_3)_{\overline{q}}-$ are all propyleneoxy units the oxygen-to-carbon atom ratio is 0.33. When 41 mole percent of the $-(OR_3)_{\overline{q}}-$ are ethyleneoxy units the oxygen-to-carbon atom ratio is 0.4.

The hydrophilic block consists mainly of ethyleneoxy units. Preferably it contains at least four mole percent propyleneoxy units such that the oxygen-to-carbon atom ratio is in excess of 0.4. For example, when the hydrophilic block contains 4 mole percent propyleneoxy units the oxygen-to-carbon atom ratio is 0.49 and when the hydrophilic block contains 50 mole percent propyleneoxy units the oxygen-to-carbon atom ratio is 0.41. Thus, the hydrophilic block contains up to about 50 mole percent propyleneoxy units, the remainder being ethyleneoxy units.

Each q and each r are independently selected integers and are such that the molecular weight of the oxyalkylated trimethylol alkane is about 1,000–8.000 and the hydrophilic block $+OR_4)_r$ forms about 5–90 weight percent of the oxyalkylated trimethylol alkane.

In one preferred embodiment the hydrophobic block $+OR_3)_q$ consists essentially of propyleneoxy units. In a more preferred embodiment the hydrophobic block consists essentially of about 60–95 mole percent propyleneoxy units and 5–40 mole percent ethyleneoxy units.

In a still more preferred embodiment, q is selected such that the combined molecular weight of the trimethylol alkane and hydrophobic blocks is about 1,000–4,000 and r is selected such that the combined molecular weight of the hydrophilic block is about 1,000–5,000 and q and r are further selected such that the average molecular weight of the oxyalkylated trimethylol alkane is about 3,000–6,000.

The oxyalkylated trimethylol propanes of this invention are known compounds. They are described in U.S. Pat. No. 3,101,374, incorporated herein by reference. These additives can be obtained from BASF Wyandotte Corporation under the name "Pluradot" (registered trademark). They are available in various molecular weights. Pluradot HA-510 has an average molecular weight of 4,600. Pluradot HA-520 has an average molecular weight of 5,000 and Pluradot HA-530 has an average molecular weight of about 5,300. All of these are very effective in the present combination.

The other required component in the combination is an ethoxylated alkylphenol. Preferably, the alkylphenol contains about 4–12 carbon atoms in the alkyl group. More preferably, the alkyl group contains about 7–12 carbon atoms such as heptylphenol, 2-ethylhexylphenol, decylphenol and dodecylphenol. The most preferred alkylphenol is nonylphenol.

The coadditive is made by reacting alkylphenol with ethylene oxide until the desired number of ethyleneoxy groups are reacted. Preferably there are an average of about 2–10 ethyleneoxy groups per each alkylphenol. More preferably each alkylphenol has an average of about 3–5 ethyleneoxy groups per molecule. The most preferred additive is an ethoxylated nonylphenol containing an average of about 4 oxyethylene groups. Such additives are commercially available. One such additive is marketed by Monsanto Company under the name "Sterox ND" (registered trademark).

The amount of each additive used need only be an amount such that the combination provide adequate corrosion and rust protection in an engine. A useful range is about 0.005–0.3 weight percent of the oxyalkylated trimethylol alkane and 0.01–0.5 weight percent of the oxyethylated alkylphenol.

Coadditives are included in the fully formulated crankcase lubricant. Examples of these are dispersants such as the polyisobutyl succinimide of ethylenepolyamine and polyisobutylphenol Mannich condensates with formaldehyde and ethylenepolyamine. Metal detergent such as calcium alkylbenzene sulfonate, magnesium petroleum sulfonate, calcium salicylates and calcium alkylphenate are conventionally included.

Of special importance in preventing rust are the overbased metal detergents. These include overbased alkaline earth metal alkylbenzene sulfonates, petroleum sulfonates, phenates, salicylates and the like. Examples of these are overbased calcium alkylbenzene sulfonate, overbased calcium petroleum sulfonate, overbased magnesium alkylbenzene sulfonate, overbased calcium salicylate, overbased calcium alkylphenate, overbased magnesium alkylphenate sulfide and the like. Overbasing methods are well known. For example, alkylbenzene sulfonic acid having an equivalent weight of about 300–2,000 can be overbased by reaction with excess calcium oxide in the presence of water and methanol followed by carbon dioxide injection. The colloidal alkaline earth metal base in these additives serve to neutralize acids in blow-by gases formed in combustion.

Viscosity index improvers are generally added to improve viscosity property of the formulated oil. These include the polyalkylmethacrylate type and the olefin copolymer type. Examples of the latter are ethylene/propylene copolymer, styrene/butadiene copolymer and the like.

Phosphosulfurized olefins can be added such as phosphosulfurized terpenes or phosphosulfurized polybutenes. These may be further reacted by steam blowing or by neutralization with alkaline earth metal bases such as barium oxide.

Phenolic antioxidants are frequently added to the oil compositions. Examples of these are 4,4'-methylenebis(2,6-di-tert-butylphenol), 2,6-di-tert-butyl-4-dimethylaminomethylphenol, 4,4'-thiobis-(2,6-di-tert-butylphenol) and the like.

Zinc salts of dihydrocarbyldithiophosphoric acid are routinely added to provide both wear and antioxidant protection. A typical example is zinc di-(2-ethylhexyl)-dithiophosphate.

The following example illustrates the preparation of a typical formulated oil suitable for use in an engine crankcase.

EXAMPLE 1

In a blending vessel place 1,000 gallons 150 SUS solvent refined mineral oil. To this add 100 gallons 1-decene oligomer containing mainly trimers and tetramers. Add sufficient zinc isobutylamyldithiophosphate to provide 0.07 weight percent zinc. Add overbased (TBN 300) calcium alkylbenzene sulfonate in an amount to provide 0.15 weight percent calcium. Add 30 gallons of a poly-laurylmethacrylate VI improver. Add sufficient polyisobutyl succinimide of tetraethylene pentamine to provide 3 weight percent active dispersant. Add 0.03 weight percent Pluradot HA-510 and 0.3 weight percent Sterox ND. Blend the oil until homogenous and package for distribution.

In many cases the additive combination of this invention is first packaged in an additive concentrate formulated for addition to lubricating oil. These concentrates contain conventional additives such as those listed above in addition to the oxyalkylated trimethylol alkane and ethoxylated alkylphenol described herein. The various additives are present in a proper ratio such that when a quantity of the concentrate is added to lubricating oil the various additives are all present in the proper concentration. The additive concentrate also contains mineral oil in order to maintain it in liquid form. The following example illustrates formulation of an additive concentrate formulated for addition to lubricating oil to provide an effective crankcase lubricant.

EXAMPLE 2

In a blending vessel place 1199.5 lbs of 100 SUS mineral oil, 784 lbs of polyisobutyl succinimide of tetraethylene pentamine, 2352 lbs of ethylene/propylene copolymer VI improver, 254.8 lbs of zinc di-(2-ethylhexyl)dithiophosphate, 245 lbs of Pluradot HA-520 and 58.8 lbs of Sterox ND. Blend until homogenous and then package. The addition of 2450 lbs of the above concentrate to 1,000 gallons of 150 SUS mineral oil will provide an effective crankcase lubricant.

Tests were carried out which demonstrate the corrosion protection provided by the present additive combination. These tests have been found to correlate with the Multi Cylinder Engine Sequence IId tests. In the test an oil blend is prepared containing a commercial succinimide ashless dispersant, a zinc dialkyldithiophosphate, an ethylene/propylene copolymer VI improver and 0.14 percent calcium as a 300 TBN overbased alkylbenzene sulfonate.

Thirty ml of 0.01 N hydrochloric acid is placed in a cell and heated to 50° C. Then 20 ml of the test oil blend is added and the mixture stirred for 10 minutes while measuring pH. The gradual increase in pH is measured over a 10-minute period and the results stated in terms of pH change per minute. It has been found that an increase of at least 0.4 pH units per minute indicates that the oil will pass the standard IId engine test. The following results were obtained in a series of these tests.

| Additive | Conc (wt %) | pH shift (units/min) |
|---|---|---|
| 1. Sterox ND | 0.3 | 0.48 |
| 2. Pluradot HA-510 | 0.3 | 0.50 |
| 3. Sterox ND | 0.15 | 0.59 |
| Pluradot HA-510 | 0.15 | |

As the above results show, the combination produces synergistic results in that their combined effect is greater than either component could contribute individually at the same concentration.

We claim:

1. A lubricating oil composition comprising a major amount of lubricating oil and a minor corrosion inhibiting amount of the combination of
   (A) an oxyalkylated trimethylol alkane having a molecular weight of about 1,000–8,000 in which an initial hydrophobic oxyalkylene block is bonded to trimethylol alkane and a terminal hydrophilic oxyalkylene block is bonded to the other end of said hydrophobic block, said hydrophobic block consisting essentially of propyleneoxy units and optionally containing from 0 to 41 mole percent random ethyleneoxy units in an amount such that the average oxygen-to-carbon atom ratio in said hydrophobic block does not exceed 0.4, said hydrophilic block consisting essentially of ethyleneoxy units and at least 4 mole percent random propyleneoxy units such that the oxygen-to-carbon atom ratio in said hydrophilic block is in excess of 0.4, said hydrophilic block forming 5–90 weight percent of said oxyalkylated trimethylol alkane,
   (B) an ethoxylated $C_{4-12}$ alkylphenol containing an average of about 2–10 ethyleneoxy units, and
   (C) an overbased metal detergent selected from the group consisting of alkaline earth metal alkylbenzene sulfonates, petroleum sulfonates, phenates, sulfurized phenates and salicylates.

2. A composition of claim 1 wherein said trimethylol alkane is trimethylol propane.

3. A composition of claim 2 wherein said hydrophobic block consists essentially of propyleneoxy units.

4. A composition of claim 2 wherein said hydrophobic block consists essentially of 60–95 mole percent propyleneoxy units and 5–40 mole percent ethyleneoxy units.

5. A composition of claim 2 wherein said trimethylol propane and hydrophobic block have a combined molecular weight of about 1,000–4,000 and said hydrophilic block has a molecular weight of about 1,000–5,000 such that the resultant molecular weight of said oxyalkylated trimethylol propane is about 3,000–6,000.

6. A composition of claim 2 wherein said ethoxylated $C_{4-12}$ alkylphenol contains an average of about 3–5 ethyleneoxy units.

7. A composition of claim 6 wherein said alkylphenol is nonylphenol.

8. A composition of claim 2 containing about 0.005–0.3 weight percent of said oxyalkylated trimethylol propane and about 0.01–0.5 weight percent of said ethoxyethylated $C_{4-12}$ alkylphenol.

9. In an additive concentrate for use in engine crankcase lubricating oil the improvement of including a corrosion inhibiting amount of the combination of
   (A) an oxyalkylated trimethylol alkane having a molecular weight of about 1,000–8,000 in which an initial hydrophobic oxyalkylene block is bonded to trimethylol alkane and a terminal hydrophilic oxyalkylene block is bonded to the other end of said hydrophobic block, said hydrophobic block consisting essentially of propyleneoxy units and optionally containing random ethyleneoxy units in an amount such that the average oxygen-to-carbon atom ratio in said hydrophobic block does not exceed 0.4, said hydrophilic block consisting essentially of ethyleneoxy units and optionally containing random propyleneoxy units such that the oxygen-to-carbon atom ratio in said hydrophilic block is in excess of 0.4, said hydrophilic block forming 5–90 weight percent of said oxyalkylated trimethylol alkane;
   (B) an ethoxylated $C_{4-12}$ alkylphenol containing an average of about 2–10 ethyleneoxy units, and
   (C) an overbased metal detergent selected from the group consisting of alkaline earth metal alkylbenzene sulfonates, petroleum sulfonates, phenates, sulfurized phenates and salicylates
said improvement functioning to protect engine parts against rust and corrosion.

10. An additive concentrate of claim 9 wherein said trimethylol alkane is trimethylol propane.

11. An additive concentrate of claim 10 wherein said trimethylol propane and hydrophobic block have a combined molecular weight of about 1,000–4,000 and said hydrophilic block has a molecular weight of about 1,000–5,000 such that the resultant molecular weight of said oxyalkylated trimethylol propane is about 3,000–6,000.

12. An additive concentrate of claim 11 wherein said ethoxyalkylated alkylphenol is an ethoxylated nonylphenol containing an average of about 4 ethyleneoxy units.

* * * * *

UNITED STATES PATENT AND TRADEMARK OFFICE
CERTIFICATE OF CORRECTION

PATENT NO. : 4,278,555
DATED : July 14, 1981
INVENTOR(S) : Zaweski et al

It is certified that error appears in the above-identified patent and that said Letters Patent are hereby corrected as shown below:

Cover page: "(73) Assignee: Ethyl Corporation
Richmond, Va."

should be

-- (73) Assignee: Edwin Cooper, Inc.
St. Louis, Mo. --

Signed and Sealed this

Twentieth Day of July 1982

[SEAL]

Attest:

GERALD J. MOSSINGHOFF

Attesting Officer

Commissioner of Patents and Trademarks